United States Patent Office 2,851,356
Patented Sept. 9, 1958

2,851,356
HOMOGENIZATION OF FISH PRODUCTS
Robert H. Bedford, San Pedro, Calif.

No Drawing. Application April 6, 1956
Serial No. 576,521

8 Claims. (Cl. 99—7)

This invention relates to the treatment of fish materials and has particular reference to a process for producing a stable, homogeneous emulsion or dispersion of fish organic matter in an aqueous solution obtained in processing fresh, frozen fresh or cooked whole fish or fish offal, and to a product produced by said process.

The term "fish stickwater" is used generally in the industry and in this specification to refer to and include the following and mixtures thereof:

(a) Press liquor or water, comprising the juices expressed from cooked whole fish or offal in the process of preparing fish meal. The fish or offal is cooked and then pressed to squeeze out as much juice and oil as possible. In this process a considerable quantity of small pieces of flesh and other tissue particles are discharged along with the juice and oil. The mixture is then centrifuged while hot, at about 90° C., to separate the oil, solid material and juice; however, separation is never complete even under the most favorable conditions.

(b) Cooker liquor or water, comprising the liquor cooked out of tuna. In preparation for canning of the various types of fresh or frozen fresh tuna, the fish is eviscerated, placed in wire mesh baskets and steam cooked in retorts for varying periods of time, depending upon the size of the fish. The liquor cooked out is similar in composition to the press water, although no mechanical pressure is used in extracting it. The mixture is then centrifuged while hot to separate the oil, solid material and juice. Occasionally a settling system is used in place of the more efficient centrifuge for separation of the various components.

In some cases, both kinds of liquors are produced simultaneously in the same plant and mixed together for subsequent handling.

The fish stickwater contains crystalline and colloidal constituents, fatty material and suspended solid particles of the various fish tissues. The stickwater contains about 5–10% total solids and is now well known in the animal feed industry as a potent source of amino acids, peptides and proteins, water soluble vitamins and minerals. It is conventionally concentrated by evaporation to yield a product containing approximately 40–50% total solids. This is necessary for preservation and to permit economical handling, storage and transportation.

The process of the present invention is applied to stickwater treated in accordance with Lassen Patents 2,188,008 and 2,372,677, wherein the stickwater is treated with an acid or acid salt and heated to precipitate certain nitrogenous and other substances. The mixture is then centrifuged to separate as much of the fatty and insoluble material as is mechanically feasible. A portion of the suspended matter remains with the dilute aqueous solution and hence, when the mixture is partially evaporated to about 50% solids, the suspended material is concentrated and some of the soluble organic materials come out of the solution to increase the amount of suspended material which may reach as high as 20% of the concentrate.

Separation of this insoluble material from the aqueous or continuous phases of the concentrate may become perceptible within a few hours after it has been manufactured. Generally, the faster the rate of separation, the more pronounced the fibrous condition of the suspended matter. Frequently, the suspended organic matter forms a mass so compacted that it will support an equal volume of the heavier, concentrated aqueous solution, when a column of the mixture is inverted. This is, of course, extremely disadvantageous and makes it difficult to properly distribute the material with dry animal feeds and to prepare uniform mixtures with other fluids.

Accordingly, one of the principal objects of this invention is to provide a process for treating fish stickwater and mixtures thereof with other fish materials, either in the dilute or concentrated form, to produce a stable, homogeneous dispersion of the insoluble organic matter in the aqueous solution.

Another object of this invention is to provide a fish stickwater concentrate in which the insoluble fractions thereof have been uniformly dispersed and remain so while the concentrate is distributed onto dry animal feeds or mixed with other fluids.

Another object of this invention is to provide a stickwater concentrate which is homogeneous and which remains so even when stored for indefinite periods.

Other objects and advantages of this invention, it is believed, will be readily apparent from the following detailed description of preferred embodiments thereof.

Briefly, this invention comprehends within its scope the discovery that the insoluble constituents of fish stickwater may be homogeneously dispersed throughout the aqueous solution to produce a stable, uniform product by the addition to the stickwater of one or more calcium compounds. The calcium compounds include calcium hydroxide, calcium chloride, calcium carbonate, calcium acetate and calcium lactate. These may be added dry or in the form of a slurry, whichever is more convenient, and they may be added to the stickwater before, during or after concentration.

The constituents of the stickwater may vary somewhat in quality and quantity, depending upon the kind of fish from which it is obtained and the specific process conditions employed. Accordingly, the quantity of the calcium compound required will also vary. The specific amount of calcium compound is preferably determined by carrying out the proceeds in the laboratory with samples of the stickwater to be treated, varying the calcium concentration until the desired homogeneous product has been obtained. Generally, from about 0.4% to about 2.0% of calcium hydroxide, or the equivalent amount of calcium in the form of one of the other calcium compounds, based on the dry weight of the solids in the stickwater, is sufficient.

If the stickwater is to be treated before concentration, the amount of dry calcium hydroxide may vary from 0.05 to 0.1%, by weight, of the stickwater, or the equivalent amount of calcium in the form of one of the other calcium compounds. When used in the form of a slurry, the calcium compound is mixed with about 1.5 times its weight of water.

As indicated, the calcium compound may be added to partially concentrated stickwater. This is of value when it is desired to partially concentrate the stickwater and then store it for later full concentration to the desired 50% total solids material. Roughly 0.3% of calcium hydroxide, on a dry basis, is used for a 30% total solids concentrate.

When adding the calcium compound to the fully concentrated material (50% total solids) it is preferred to add from about 0.5% to about 1.0% of calcium hydroxide or the equivalent amount of another calcium compound.

The following specific examples are illustrative of the process of this invention, but it is not intended to limit the invention thereto:

Example 1

|  | Gm. |
|---|---|
| Tuna and mackerel stickwater—ca. 6% total solids | 800.00 |
| Calcium hydroxide | 0.40 |
| Water | 0.60 |

Example 2

| Tuna stickwater—ca. 6% total solids | 1000.00 |
|---|---|
| Calcium hydroxide | 0.50 |
| Water | 0.75 |

Example 3

| Mackerel and tuna stickwater—ca. 6% total solids | 1000.00 |
|---|---|
| Calcium acetate $(Ca(C_2H_3O_2)_2HOH)$ | 1.17 |
| Water | 1.75 |

It will be noted that Examples 1, 2 and 3 illustrate the process of this invention as applied to the stickwater before concentration thereof. In each case, the stickwater was acidified to a pH of 4.4 with sulfuric acid and heated to about 90° C. to precipitate a certain amount of the nitrogenous and other insolublized substances, in accordance with the teachings of said Lassen patents. The mixture was then centrifuged to separate as much of the fatty and insoluble material as possible. The resulting treated stickwater contained about 6% total solids in each case, as indicated in the examples. The calcium compound was then simply mixed therewith to produce a dilute material which then was concentrated to 50% total solids, resulting in a homogeneous, stable dispersion of the insolubles in the aqueous solution of concentrated stickwater.

Example 4

|  | Gm. |
|---|---|
| Tuna and sardine stickwater concentrate—ca. 30% total solids | 200.00 |
| Calcium acetate—$Ca(C_2H_3O_2)_2HOH$ | 1.40 |
| Water | 2.10 |

Example 4 illustrates the process as applied to the treatment of partially concentrated stickwater. The treatment of the stickwater was the same as in Examples 1–3, with the exception that the pH was raised to 4.5.

Example 5

|  | Gm. |
|---|---|
| Tuna stickwater concentrate—50% total solids | 100.00 |
| Calcium hydroxide—$Ca(OH)_2$ | 0.50 |
| Water | 0.75 |

Example 6

| Mixture—70% tuna stickwater concentrate and 30% concentrated fish hydrolysate, 50% total solids | 100.00 |
|---|---|
| Calcium chloride—$CaCl_2 2HOH$ | 1.00 |
| Water | 1.50 |

Example 7

| Mixture—70% tuna stickwater concentrate and 30% concentrated fish hydrolysate, 50% total solids | 100.00 |
|---|---|
| Calcium carbonate—$CaCO_3$ | 0.70 |
| Water | 1.05 |

Example 8

| Mixture—70% tuna stickwater concentrate and 30% concentrated fish hydrolysate, 50% total solids | 100.00 |
|---|---|
| Calmium lactate—$Ca(C_3H_5O_3)_2 5HOH$ | 2.10 |
| Water | 3.15 |

Example 9

| Mixture—70% tuna stickwater concentrate and 30% concentrated fish hydrolysate, 50% total solids | 100.00 |
|---|---|
| Calcium acetate—$Ca(C_2H_3O_2)_2HOH$ | 1.20 |
| Water | 1.80 |

Examples 5–9 illustrate the process of this invention as applied to the treatment of the stickwater after evaporative concentration to 50% solids. The pre-treatment of the stickwater was the same as in Examples 1–3. In Examples 6–9 and in Examples 12 and 13 below, it will be noted that concentrated fish hydrolysate was added to the concentrated stickwater. This hydrolysate was prepared in accordance with Example 4 of my copending application Serial No. 428,363, filed May 7, 1954, on "Process for the Treatment of Fish and Product Thereof," as follows: 500 parts of raw tuna viscera and 500 parts of cooked tuna offal were added to each other and passed through a meat grinder. The ground mixed material fell into a hopper to which 335 parts of water were gradually added, and the whole mixture was pumped to a steam jacketed kettle. Agitation of the mixture was started at the beginning of the filling of the kettle and it was maintained during the whole of the digestion period. When the kettle was filled, steam was turned into the jacket and the mixture heated to 50° C. This temperature was maintained for the primary period of digestion. The hydrogen ion concentration was gradually changed (over a period of about 1 hour) from pH 6.0 to pH 8.0 with 50% sodium hydroxide solution. The total primary digestion was for a period of 4 hours. At the end of this period the bones were separated from the soluble and finely suspended organic matter and the oil by pumping the mixture from the kettle first through a revolving screen to take out large-sized bone particles and then through a basket centrifuge operating at 2000 R. P. M. to remove the fine bone particles. The bone-free material was then pumped to another tank through a heat exchanger to raise the temperature again to 50° C. for a continued digestion period of 18 hours. This temperature was maintained by recirculation through the heat exchanger. At the end of the secondary period the hydrolysate was rapidly heated to 80° C. by means of the heat exchanger and immediately passed through a high speed De Laval centrifuge to separate the oil from the aqueous solution. The addition of the calcium compound to such mixtures resulted in a stable, homogeneous dispersion of this hydrolysate as well as the insoluble material normally presented in the concentrated stickwater.

The process of this invention has been applied to the homogenization of industrially produced stickwater concentrate. This material was produced in accordance with said Lassen patents by acidification of the stickwater to a pH of about 4.5 with sulfuric acid at a temperature of about 90° C., followed by centrifugation. The centrifuged supernatant (refined stickwater) was concentrated by heating to a temperature of about 212° F. as it passed into the first of the steam heated multiple effect evaporators which were under partial vacuum. The rate of input of the stickwater was correlated with the output of concentrate containing 50% or more total solids.

This concentrate separated into two layers, a clear, dark-colored lower aqueous layer and an upper layer of fibrous organic matter admixed with fatty material. Sometimes this separation occurred within two hours of sampling, and frequently the lower layer comprised 40% of the total volume.

In carrying out the process of this invention as applied to such industrial material, the concentrate was first thoroughly mixed by means of a screw propeller type agitator, operating horizontally about three feet from the bottom of the tank, and then pumped through a three-inch pipe to another storage tank. The calcium hydroxide slurry was fed into the three-inch line on the discharge side of the pump in proportion to the rate of flow of the concentrate. Agitation to mix thoroughly the treated concentrate was continued in the receiving tank. The suspended organic matter, comprising mostly nitrogenous and fatty material, was found to be peptized and homogeneously dispersed. Samples still retained these characteristics after six months' storage. The following examples represent different batches so prepared:

*Example 10*

| | Lb. |
|---|---|
| Sardine stickwater concentrate, 50% total solids | 900,000 |
| Calcium hydroxide | 8,100 |
| Water | 12,180 |

*Example 11*

| | Lb. |
|---|---|
| Tuna stickwater concentrate, 54% total solids | 81,640.00 |
| Calcium hydroxide | 300.00 |
| Water | 450.00 |

*Example 12*

| | Lb. |
|---|---|
| 70% tuna stickwater concentrate, 30% concentrated fish hydrolysate, 50% total solids | 78,280.00 |
| Calcium hydroxide | 160.00 |
| Water | 240.00 |

*Example 13*

| | Lb. |
|---|---|
| 45% tuna stickwater concentrate, 15% mackerel stickwater concentrate, 30% fish hydrolysate 10% sardine stickwater concentrate, 50% total solids | 81,100.00 |
| Calcium hydroxide | 200.00 |
| Water | 300.00 |

*Example 14*

| | Lb. |
|---|---|
| Sardine stickwater concentrate, 50% total solids | 320,000.00 |
| Calcium hydroxide | 1,920.00 |
| Water | 2,880.00 |

Having fully described my invention, it is to be understood that I do not wish to be limited to the details set forth, but my invention is of the full scope of the appended claims.

I claim:

1. In a process for producing a stable fluid homogeneous dispersion of refined fish stickwater concentrate, the step comprising adding thereto a calcium compound dispersing agent selected from the group consisting of calcium hydroxide, calcium chloride, calcium carbonate, calcium acetate and calcium lactate in a minor amount but in an amount effective to retain the fish solids in stable suspension.

2. The process as defined in claim 1 wherein said calcium compound is calcium hydroxide.

3. In a process for the production of a stable, fluid homogeneous fish product, the step comprising adding to refined fish stickwater concentrate containing about 50% solids a calcium compound dispersing agent providing a calcium content equivalent to that which would be provided by from about 0.5 to about 1.0% by weight of calcium hydroxide based on the dry weight of the solids in said stickwater concentrate.

4. A stable, fluid homogenized fish product comprising concentrated fish stickwater containing a calcium compound dispersing agent selected from the group consisting of calcium hydroxide, calcium chloride, calcium carbonate, calcium acetate and calcium lactate in a minor amount but in an amount effective to retain the fish solids in stable suspension.

5. The product of claim 4 wherein said calcium compound is calcium hydroxide.

6. A stable, fluid homogenized fish product comprising concentrated fish stickwater containing a calcium compound dispersing agent in an amount providing a calcium content equivalent to that which would be provided by from about 0.5 to about 2.0% by weight of calcium hydroxide based on the weight of the solids in said fish stickwater.

7. In a process for producing a stable, fluid homogeneous dispersion of refined fish stickwater concentrate, the steps comprising mixing with fish stickwater as a dispersing agent calcium hydroxide in a minor amount but in an amount effective to retain the fish solids in stable suspension, and concentrating the admixture thus formed.

8. In a process for the production of a stable, fluid homogeneous fish product the steps comprising mixing with the fish stickwater as a dispersing agent a calcium compound in an amount providing a calcium content equivalent to that which would be provided by from about 0.5 to about 2.0% by weight of calcium hydroxide, based on the dry weight of the solids in the stickwater, and concentrating the admixture thus formed.

References Cited in the file of this patent

UNITED STATES PATENTS

| 1,831,164 | Dawe | Nov. 10, 1931 |
| 2,566,549 | Beckwith et al. | Sept. 4, 1951 |